(12) United States Patent
Schwengler et al.

(10) Patent No.: US 6,445,684 B1
(45) Date of Patent: Sep. 3, 2002

(54) METHOD AND SYSTEM FOR DYNAMIC ADJUSTMENT OF CDMA WIRELESS DEVICE POWER LEVELS

(75) Inventors: Thomas Schwengler, Lakewood; Mark J. Poletti, Louisville, both of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/203,305

(22) Filed: Dec. 1, 1998

(51) Int. Cl.[7] .................................. H04B 1/00
(52) U.S. Cl. .................. 370/311; 370/335; 370/342; 455/67.1
(58) Field of Search .................. 370/252, 311, 370/328, 335, 342, 441; 455/67.1, 69, 70, 127, 68, 38.1, 38.3, 515, 115, 224.1

(56) References Cited

U.S. PATENT DOCUMENTS

| | | | |
|---|---|---|---|
| 5,241,690 A | * 8/1993 | Larsson et al. | 455/54.1 |
| 5,574,984 A | * 11/1996 | Reed et al. | 455/69 |
| 5,629,934 A | 5/1997 | Ghosh et al. | |
| 5,646,937 A | 7/1997 | Nakano et al. | |
| 5,671,218 A | 9/1997 | I et al. | |
| 5,784,360 A | 7/1998 | I et al. | |
| 5,943,014 A | * 8/1999 | Gilhousen | 342/465 |
| 6,208,873 B1 | * 3/2001 | Black et al. | 455/522 |
| 6,292,471 B1 | * 9/2001 | Cao et al. | 370/252 |

* cited by examiner

*Primary Examiner*—Ricky Ngo
(74) *Attorney, Agent, or Firm*—Townsend and Townsend and Crew LLP

(57) ABSTRACT

Methods for use in code division multiple access (CDMA) communication systems includes identifying signal strength needs (in terms of Eb/No) of wireless devices in a sector of a base station. Signal strength needs are determined as a function of the rate of movement of the wireless devices within the sector. The methods include dynamically adjusting the signal strength to a given Eb/No level for each of the wireless devices as a function of the needs of the majority of wireless devices in the sector, dynamically adjusting the signal strength to given Eb/No levels for different classes of wireless devices as a function of the needs of each class of wireless devices in the sector, and dynamically adjusting the signal strength to given Eb/No levels for each individual wireless device as a function of the need of each wireless device.

18 Claims, 2 Drawing Sheets

METHOD AND SYSTEM FOR DYNAMIC ADJUSTMENT OF CDMA WIRELESS DEVICE POWER LEVELS

TECHNICAL FIELD

The present invention relates generally to code division multiple access (CDMA) communication systems and, more particularly, to power control for CDMA communication systems.

BACKGROUND ART

Code division multiple access (CDMA) is a technique used in personal communication service (PCS) systems for permitting the simultaneous access by multiple wireless devices to a single uplink frequency channel of a base station. In CDMA, a digital signal located at a wireless device is multiplied at the wireless device by a unique code corresponding to that device, which spreads the digital signal over a greater bandwidth. For example, a 10 kHz signal may be multiplied by a code which effectively creates a 100 kHz spread signal.

The spread signal modulates a carrier frequency signal which is in the range of the uplink frequency channel. The modulated carrier is then transmitted from the wireless device to the base station. The base station receives a composite spread signal of all the modulated carrier frequency signals from all wireless devices transmitting at that point in time. The base station demodulates the composite spread signal and then partially despreads the demodulated signal using the same unique code used at a particular wireless device for spreading. The despread signal approximates the pre-spreading data signal for the particular wireless device.

Within a sector of a base station, the population of PCS users can be split into fixed and mobile wireless users. A fixed user is a user that stays in place or moves at a relatively low rate of speed such as when walking during a call. A mobile user is a user that moves at a relatively high rate of speed such as when traveling in a vehicle during a call. All users are located within a sector of the base station for wireless communication with the base station.

Typically, each user in the sector is allocated the same amount of power to communicate with the base station. The measure of power allocated to each user is defined as the ratio of energy per bit to the noise power spectral density (Eb/No). The Eb/No level for each user is measured at the base station. In the prior art, the Eb/No level is set at the same level for all users in the sector and is dictated by the needs of mobile users. Unfortunately, this leads to a waste of resources for fixed users whose Eb/No level may be lower.

In general, mobile users have a higher requirement for Eb/No than fixed users. The multipath and fading experienced by a fixed user is much less volatile than that experienced by a mobile user because the fixed user resides in a fixed location. Because of the less severe fading environment, less power is needed to overcome the less volatile fast and slow fades. As a result, a lower Eb/No level can maintain the quality of the signal. The industry usually accepts Eb/No levels of 4 decibels (dB) for fixed users and 7 dB for mobile users.

A lower Eb/No correlates to greater capacity. Thus, if fixed users are allocated a different Eb/No level than mobile users (i.e., approximately three decibels less), rather than have the same Eb/No level as in prior art systems, then optimal base station capacity can be maintained while maintaining the quality of service for both fixed and mobile users. Consequently, what is needed is a method and system which dynamically adjusts Eb/No levels as a function of the needs of the users.

SUMMARY OF THE INVENTION

Accordingly, it is an object of the present invention to provide a method and system for dynamically adjusting an Eb/No level for a sector of a base station as a function of the needs of the majority of users in the sector.

It is another object of the present invention to provide a method and system for dynamically adjusting Eb/No levels for a sector of a base station as a function of the needs of each class of users in the sector.

It is a further object of the present invention to provide a method and system for dynamically adjusting Eb/No levels for a sector of a base station as a function of the needs of each user in the sector.

In carrying out the above objects and other objects, the present invention provides a method for controlling transmitted power of wireless devices within a sector of a base station of a code division multiple access (CDMA) communication system. The method includes estimating rate of movement of a wireless device. The rate of movement of the wireless device is then compared to a given rate of movement threshold interval. The transmitted power of the wireless device is then set to a power level corresponding to the given rate of movement threshold interval if the rate of movement of the wireless device falls within the given rate of movement threshold interval.

Further, the present invention provides another method for controlling transmitted power of wireless devices in a CDMA communication system. This method includes estimating rate of movement of each of the wireless devices. An average rate of movement of all of the wireless devices over a given time period is then determined from the estimated rates of movement of each of the wireless devices. The average rate of movement of all of the wireless devices is then compared to a given rate of movement threshold. The transmitted power of all of the wireless devices is then set to a high power level if the average rate of movement of all of the wireless devices is greater than the given rate of movement threshold. Similarly, the transmitted power of all of the wireless devices is set to a low power level if the average rate of movement of all of the wireless devices is less than the given rate of movement threshold.

Still further, the present invention provides yet another method for controlling transmitted power of wireless devices in a CDMA communication system. This method includes estimating rate of movement of each of the wireless devices. The rate of movement of each of the wireless devices is then compared to a given rate of movement threshold. The transmitted power of a wireless device is then set to a high power level if the rate of movement of the wireless device is greater than the given rate of movement threshold. Similarly, the transmitted power of a wireless device is set to a low power level if the rate of movement of the wireless device is less than the given rate of movement threshold.

The advantages accruing to the present invention are numerous. For instance, by adjusting the transmitted power of the wireless devices as a function of their needs, optimal base station capacity and the quality of service for both fixed and mobile users are maintained.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
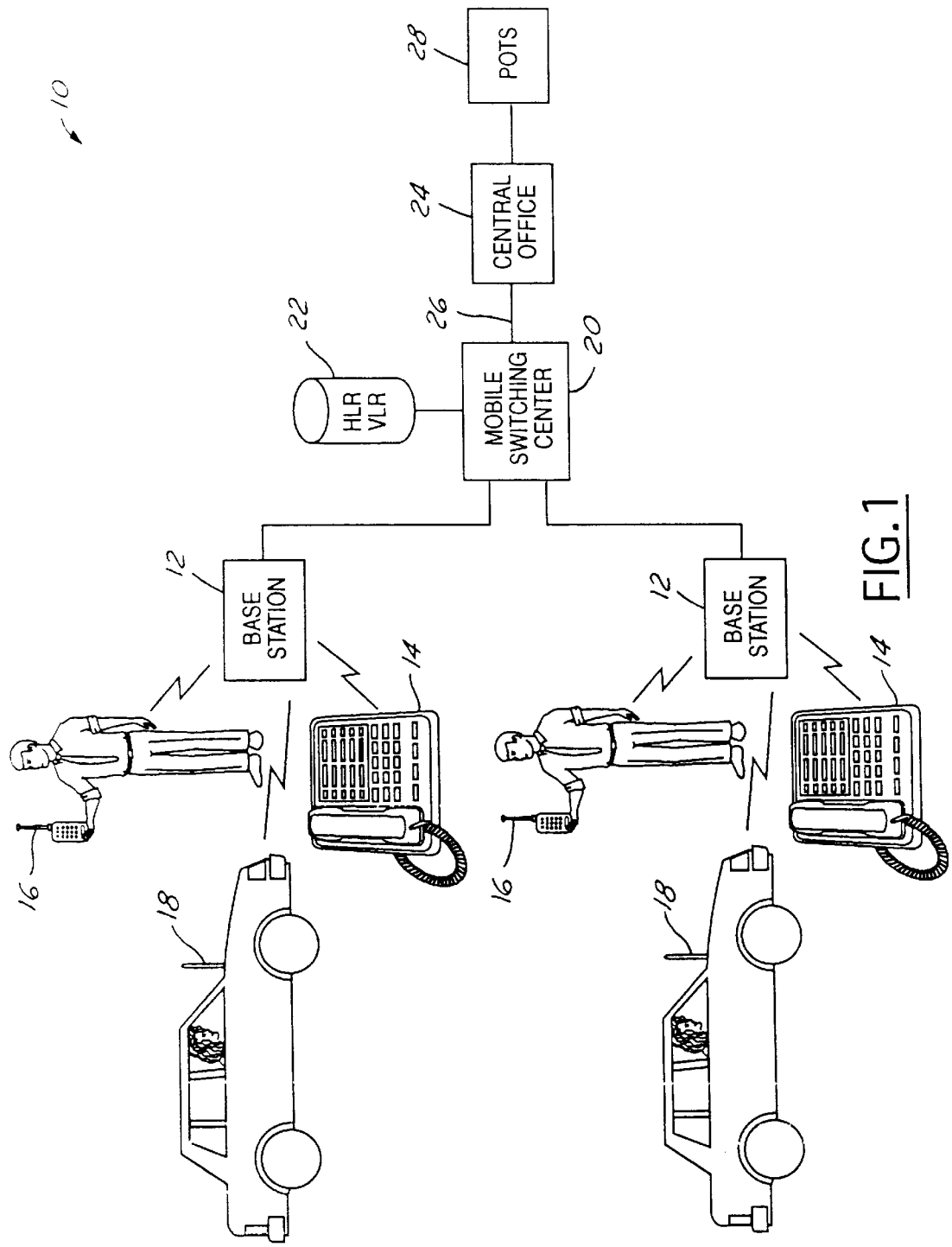
FIG. 1 is a schematic representation of a personal communication service (PCS) system in accordance with the present invention.

Referring now to FIG. 1, a personal communication service (PCS) system 10 in accordance with a preferred embodiment of the present invention is shown. PCS system 10 includes a base station 12, a stationary wireless device 14, a pedestrian wireless device 16, and a vehicular wireless device 18. Base station 12 transmits and receives code division multiple access (CDMA) wireless data signals with stationary device 14, pedestrian device 16, and vehicular device 18. Accordingly, base station 12 and devices 14, 16, and 18 include transmitter and receiver modules.

Stationary wireless device 14 may be a household telephone which remains in place during communication with base station 12. Pedestrian wireless device 16 is a hand-held telephone which moves at a relatively slow rate of speed as the user walks while communicating with base station 12. Vehicular wireless device 18 is a telephone configured for use in a vehicle and moves at a relatively high rate of speed as the user drives the vehicle while communicating with base station 12 via the vehicular wireless device.

PCS system 10 further includes a mobile switching center 20 and a home location register/visitor location register (HLR/VLR) database 22 operable with mobile switching center 20. Mobile switching center 20 is also connected to a central office 24 via an inter-office trunk 26. Central office 24 is connected to a wireline phone 28 (plain old telephone service (POTS)).

In operation, the Eb/No level of a wireless device is measured at the receiver of base station 12 in conjunction with mobile switching center 20. Thus, the reverse link from a wireless device to base station 12 determines the Eb/No level. Base station 12 compares the measured Eb/No level with a nominal Eb/No level. If the measured Eb/No level is greater than the nominal Eb/No level, then base station 12 transmits a data message to the wireless device instructing the wireless device to reduce its transmitted power. As the power is reduced, the measured Eb/No level eventually meets the nominal Eb/No level. Similarly, if the measured Eb/No level is less than the nominal Eb/No level, then base station 12 transmits a data message to the wireless device instructing the wireless device to increase its transmitted power. As the power is increased, the measured Eb/No level eventually meets the nominal Eb/No level. The power transmitted by the wireless device is varied to maintain a constant receive power level at base station 12 from all of the wireless devices in use in the sector to minimize cochannel interference and optimize the capacity of the base station.

The capacity of base station 12 is inversely proportional to the nominal Eb/No level. The lower the nominal Eb/No level the greater the capacity to service more wireless devices. The reverse link closed power control described above minimizes cochannel interference by maintaining a constant Eb/No level. With a constant Eb/No level, all wireless devices in the sector transmit at levels where the received power from each wireless device is at the same signal strength as measured by base station 12. Allocating just enough Eb/No maximizes the capacity of base station 12 while allocating any more power reduces the capacity of the base station.

Figure 2:
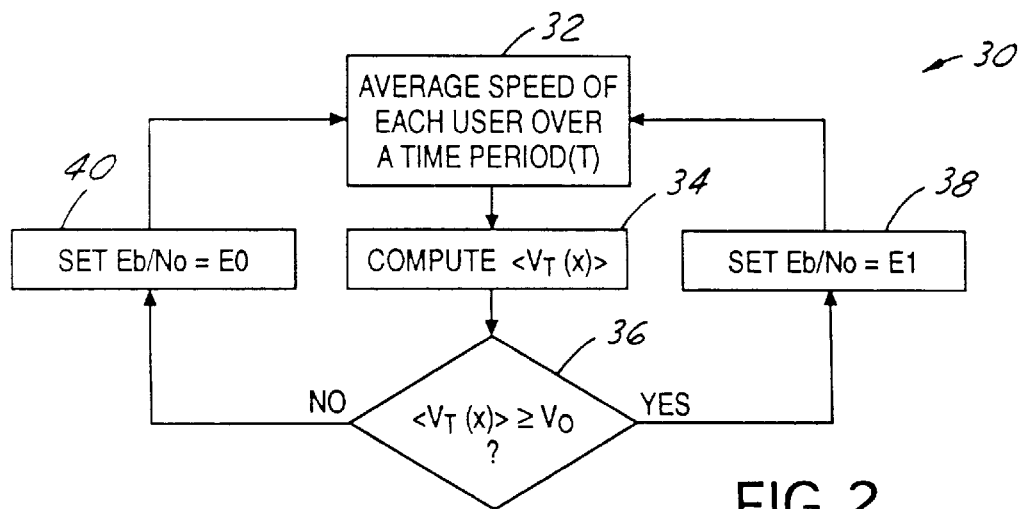
FIG. 2 is a flow diagram representing a specific operation of the method and system of the present invention.

Referring now to FIG. 2, a flow diagram 30 representing operation of the system and method according to the present invention is shown. The operation described by flow diagram 30 is carried out by base station 12 and mobile switching center 20. Flow diagram 30 differentiates the users in a sector as either being fixed or mobile users. In general, the average speed of all of the users in the sector is estimated and then a given Eb/No level is assigned to all of the users as a function of the average speed. The given Eb/No level is either a relatively low fixed user Eb/No level if the majority of users are fixed users or is a relatively high mobile user Eb/No level if the majority of users are mobile users.

Initially, block 32 determines the average speed of each user in a sector over a time period (T). Block 34 then determines the average speed ($<V_T(X)>$) of all of the users or a selected percentage or group of users over the time period. Block 36 then compares $<V_T(X)>$ to a threshold speed $v_0$ (e.g., 1 m/s). At $v_0$, fast fading is not a problem and therefore the required Eb/No level may be lower. If $<V_T(X)>$ is greater than $v_0$, the majority of users are mobile users. Block 38 then sets the Eb/No level for all of the users to the mobile user Eb/No level which is E1. If $<V_T(X)>$ is less than $v_0$, the majority of users are fixed users. Block 40 then sets the Eb/No level for all of the users to the fixed user Eb/No level which is E0. The above process is then repeated with block 32 updating the average speed of each user in the sector.

Preferably, each of the fixed and mobile user Eb/No levels (E1, E0) include minimum and maximum levels centered around a nominal level. For instance, the mobile user Eb/No level E1 includes a nominal Eb/No, a minimum Eb/No, and a maximum Eb/No. The minimum Eb/No level ensures capacity and the maximum Eb/No level improves quality.

The nominal Eb/No level works in conjunction with the set frame error rate (FER) of base station 12. For example, when a mobile user stops at a red traffic light, the fading environment becomes less volatile because the mobile user is stationary. Typically, this causes the Eb/No level to be reduced because less mobile transmit power is required to maintain the Eb/No level. However, if the measured FER meets the system set value with a measured Eb/No level less than the nominal Eb/No level, then base station 12 allows the mobile user to keep lowering the mobile transmit power until the minimum Eb/No level is reached. Once the traffic light becomes green and the mobile user goes back into motion, the fading environment becomes more volatile and the mobile user requires more transmit power to maintain a reliable Eb/No level. A minimum Eb/No level is required to minimize the time it takes for the Eb/No level measurement process to catch up with the speed of the mobile user. If the mobile user moves too quickly and the minimum Eb/No level is set to low, the base station messaging to increase the mobile power could take too long to reach an acceptable Eb/No level, potentially resulting in degraded service quality and perhaps a dropped call. A maximum Eb/No level is required to put an upper limit on the amount of mobile transmit power for situations where overshoot occurs during the catch up process. The above is an example of one of the many that describe the random behavior of a mobile user. The example emphasizes that the mobile user will be mobile at randomly different speeds.

Different processes may be used for determining the average speed of each user over the time period (T) by block 32. These methods include the following. First, a database of profiles for each user having the highest probability of use (fixed or mobile) of the user may be utilized to determine the speed of the user. Second, power control values may be examined. Power control values usually give hints on the amount of fading and therefore provide an estimate of the speed of the users. Third, the variation in time of the path delay information of CDMA parameters for each leg can be used to provide an estimate of the speed of the users. A leg is a term referring to each of the established ice path connections. Fourth, examining the number of different P/N codes used in a past time period. For example, if less than five P/N codes have been used in the past time period the user is probably moving slowly or not at all. Fifth, past Eb/No levels can be examined. If mobile users have an Eb/No level constantly around the minimum mobile user Eb/No level, then these mobile users can be considered as being fixed users. Similarly, if fixed users have an Eb/No level constantly around the maximum fixed user Eb/No level, then these fixed users can be considered as being mobile users.

In addition to the processes described above, global positioning system (GPS) information for mobile hand sets may also be employed. GPS information may be used to estimate individual user position. Such information may be used to provide an estimate of the speed of the user.

Figure 3:
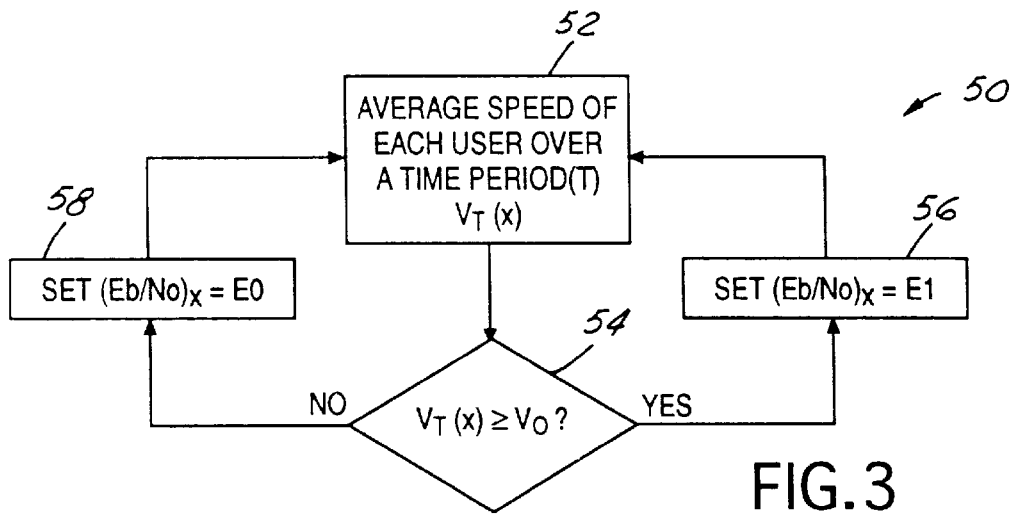
FIG. 3 is a flow diagram representing a specific operation of the method and system of the present invention.

Referring now to FIG. 3, a flow diagram 50 representing operation of the system and method according to the present invention is shown. The operation described by flow diagram 50 is carried out by base station 12 and mobile switching center 20. In general, flow diagram 50 determines, for each of the users, whether an individual user is fixed or mobile and then assigns a fixed or mobile user Eb/No level to that user. To carry out this operation, the average speed of each of the users is estimated and then a given Eb/No level is assigned to each of the users. The given Eb/No level assigned to a user is either a relatively low fixed user Eb/No level is the user is a fixed user or is a relatively high mobile user Eb/No level is the user is a mobile user.

Initially, block 52 determines the average speed $v_T(X)$ of each user (x) in a sector over a time period (T). Block 54 then compares $v_T(x)$ to a threshold speed $v_0$. If $v_T(x)$ is greater than or equal to $v_0$, the user is a mobile user. Block 56 then sets the Eb/No level for the user to the mobile user Eb/No level which is E1. If $V_T(X)$ is less than $v_0$, the user is a fixed user. Block 58 then sets the Eb/No level for the user to the fixed user Eb/No level which is E0. The above process is then repeated with block 52 updating the average speed of each user in the sector.

Figure 4:
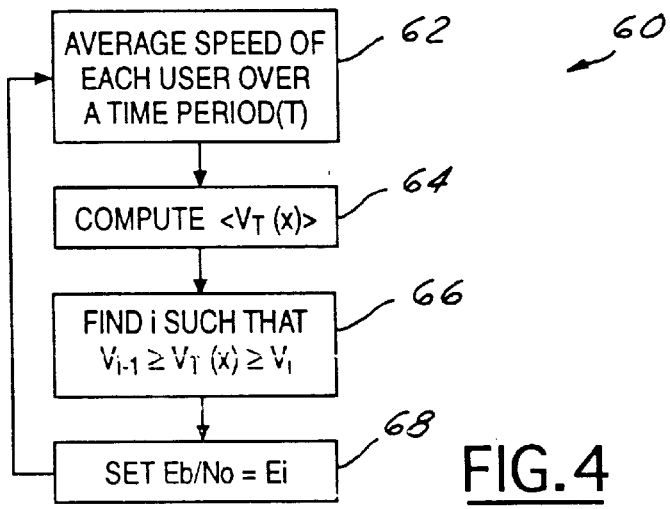
FIG. 4 is a flow diagram representing general operation of the method and system of the present invention.

Referring now to FIG. 4, a flow diagram 60 representing the general operation of the method and system according to the present invention are shown. Flow diagram 60 encompasses three levels of refinement depending upon how many different Eb/No profiles are allowed per sector. The first level of refinement is that if only one Eb-No profile is allowed, then a fixed (mobile) user Eb/No level is assigned to all of the users in the sector if the majority of users are fixed (mobile) users. This was described in conjunction with flow diagram 30 of FIG. 2. The second level of refinement is that if two Eb/No profiles are allowed per sector, then, for each user, a fixed (mobile) user Eb/No level is assigned to a user in the sector if the user is a fixed (mobile) user. This was described in conjunction with flow diagram 50 of FIG. 3. If three Eb/No profiles are allowed per sector, then a pedestrian class of users can be added to the fixed and mobile users. The third level of refinement is that if many Eb/No profiles are allowed per sector, then each user can be assigned an individual Eb/No level.

Flow diagram 60 summarizes the level of detail that may be considered (per sector, per class of users, and per individual user). Initially, block 62 determines the average speed of each user over a time period (T). Block 64 then computes the average user speed $v_T(x)$ over a time period (T). Depending upon the level of refinement, the average user speed $v_T(x)$ is either the average speed of all of the users, the average speed of a given class of users, or the average speed of each user.

Block 66 then compares $v_T(x)$ to speed thresholds $v_i$ and $v_{i-1}$. The speed thresholds determine what Eb/No levels to set. There is only one speed threshold if differentiating between fixed and mobile users. There are two speed thresholds if differentiating between fixed, mobile, and pedestrian users. It should be noted that there may be further reasons to find additional distinctions, e.g., premium users or data/multimedia users that have different Eb/No needs.

Block 68 then sets the Eb/No level to Ei. The Ei level is a set of Eb/No settings for a speed threshold interval defined above. The Ei level includes minimal Eb/No, maximum Eb/No, and nominal Eb/No.

Thus it is apparent that there has been provided, in accordance with the present invention, a method and system for the dynamic adjustment of CDMA wireless device power levels that fully satisfy the objects, aims, and advantages set forth above.

While the present invention has been described in conjunction with specific embodiments thereof, it is evident that many alternatives, modifications, and variations will be apparent to those skilled in the art in light of the foregoing description. For instance, the wireless devices have a parameter called the Ec/Io which is analogous to Eb/No at the base station. The teachings of the present invention are applicable to adjusting the Ec/Io levels. Further, in addition to the PCS system, the present invention is applicable to cellular radio systems employing CDMA techniques. Accordingly, the present invention is intended to embrace all such alternatives, modifications, and variations as fall within the spirit and broad scope of the appended claims.

What is claimed is:

1. A method for controlling transmitted power of wireless devices within a sector of a base station of a code division multiple access communication system, the method comprising:

estimating rate of movement of each of the wireless devices;

determining an average rate of movement of all of the wireless devices over a given time period from the estimated rates of movement of each of the wireless devices;

comparing the average rate of movement of all of the wireless devices to a given rate of movement threshold;

setting the transmitted power of all of the wireless devices to a high power level if the average rate of movement of all of the wireless devices is greater than the given rate of movement threshold; and setting the transmitted power of all of the wireless devices to a low power level if the average rate of movement of all of the wireless devices is less than the given rate of movement threshold.

2. The method of claim 1 wherein:
the high power level includes a range of high power levels.

3. The method of claim 1 wherein:
the low power level includes a range of low power levels.

4. A method for controlling transmitted power of wireless devices within a sector of a base station of a code division multiple access communication system, the method comprising:
estimating rate of movement of each of the wireless devices;
comparing the rate of movement of each of the wireless devices to a given rate of movement threshold;
setting the transmitted power of a wireless device to a high power level if the rate of movement of the wireless device is greater than the given rate of movement threshold.

5. The method of claim 4 further comprising:
setting the transmitted power of a wireless device to a low power level if the rate of movement of the wireless device is less than the given rate of movement threshold.

6. The method of claim 4 wherein:
the high power level includes a range of high power levels.

7. The method of claim 5 wherein:
the low power level includes a range of low power levels.

8. A method for controlling transmitted power of a wireless device within a sector of a base station of a code division multiple access communication system, the method comprising:
estimating rate of movement of the wireless device;
comparing the rate of movement of the wireless device to a given rate of movement threshold interval; and
setting the transmitted power of the wireless device to a power level corresponding to the given rate of movement threshold interval if the rate of movement of the wireless device falls within the given rate of movement threshold interval.

9. The method of claim 8 wherein:
the power level includes a range of power levels.

10. A code division multiple access communication system, the system comprising:
a plurality of wireless devices; and
a base station operable to transmit and receive data signals with the wireless devices, the base station further operable to estimate rate of movement of a wireless device and then compare the rate of movement of the wireless device to a given rate of movement threshold interval, the base station further operable to set the transmitted power of the wireless device to a power level corresponding to the given rate of movement threshold interval if the rate of movement of the wireless device falls within the given rate of movement threshold interval.

11. The method of claim 10 wherein:
the wireless devices include mobile devices.

12. The method of claim 10 wherein:
the wireless devices include fixed devices.

13. The system of claim 10 wherein:
the wireless devices include pedestrian devices.

14. The system of claim 10 wherein:
the power level includes a range of power levels.

15. The system of claim 10 wherein:
the given rate of movement threshold interval includes a low rate of movement and a high rate of movement.

16. The method of claim 8, wherein:
estimating rate of movement of the wireless device comprises using power control values.

17. The method of claim 8, wherein:
the base station and the wireless device are in communication through a plurality of established v ice path connections, wherein each connection includes path delay information; and
estimating rate of movement of the wireless device comprises measuring the path delay information for each of the connections.

18. The method of claim 8, wherein:
the wireless device receives positional information for a global positioning system; and
estimating rate of movement of the wireless device comprises calculating movement from the positional information.

* * * * *